United States Patent
Moreau, Jr. et al.

(10) Patent No.: US 7,207,479 B2
(45) Date of Patent: Apr. 24, 2007

(54) SYSTEMS AND METHODS FOR AUTOMATICALLY ESTABLISHING MERCHANT ACCOUNTS FOR TRANSACTION CARD USAGE

(75) Inventors: Abner E. Moreau, Jr., New York, NY (US); Gintas P. Balodis, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 99 days.

(21) Appl. No.: 10/616,434

(22) Filed: Jul. 9, 2003

(65) Prior Publication Data
US 2004/0112954 A1 Jun. 17, 2004

Related U.S. Application Data

(60) Provisional application No. 60/432,776, filed on Dec. 11, 2002.

(51) Int. Cl.
*G06K 5/00* (2006.01)
(52) U.S. Cl. .................. 235/380; 235/381
(58) Field of Classification Search ............. 235/380, 235/381, 375, 383, 384, 385, 379, 38, 26, 235/27, 39, 14; 705/38, 26, 27, 39
See application file for complete search history.

(56) References Cited

U.S. PATENT DOCUMENTS

| | | | |
|---|---|---|---|
| 5,577,109 A * | 11/1996 | Stimson et al. .......... 379/114.2 |
| 6,189,787 B1 | 2/2001 | Dorf | |
| 6,330,548 B1 * | 12/2001 | Walker et al. ................ 705/38 |
| 6,386,444 B1 * | 5/2002 | Sullivan ..................... 235/379 |
| 6,473,500 B1 | 10/2002 | Risafi et al. | |
| 6,629,135 B1 | 9/2003 | Ross, Jr. et al. ............ 709/218 |
| 6,745,938 B2 * | 6/2004 | Sullivan ..................... 235/379 |
| 6,832,720 B2 * | 12/2004 | Dawson ..................... 235/381 |
| 2004/0029569 A1 * | 2/2004 | Khan et al. ............. 455/414.1 |
| 2004/0083123 A1 | 4/2004 | Kim et al. | |
| 2004/0112954 A1 * | 6/2004 | Moreau et al. ............. 238/380 |
| 2004/0193539 A1 * | 9/2004 | Sullivan ..................... 705/39 |
| 2004/0225602 A1 * | 11/2004 | Smith ......................... 705/39 |
| 2005/0283435 A1 * | 12/2005 | Mobed et al. ............... 705/39 |
| 2006/0020507 A1 * | 1/2006 | Sagey ......................... 705/14 |

OTHER PUBLICATIONS

International Search Report for PCT/US03/039340 dated Jul. 26, 2004.

* cited by examiner

*Primary Examiner*—Thien M. Le
(74) *Attorney, Agent, or Firm*—Fitzpatrick, Cella, Harper & Scinto

(57) ABSTRACT

Systems and methods are provided for automatically establishing merchant accounts for transaction card usage. More specifically, the systems and methods allow an agent to automatically apply for and automatically receive approval for a merchant to transact commerce with customers who use a transaction card. Moreover, the systems and methods provide real-time information, such as approval or denial notifications and reports to an agent. In addition, the systems and methods provide secure file transfers between an agent and a transaction card issuer/processor.

20 Claims, 1 Drawing Sheet

SYSTEMS AND METHODS FOR AUTOMATICALLY ESTABLISHING MERCHANT ACCOUNTS FOR TRANSACTION CARD USAGE

CROSS REFERENCE TO RELATED APPLICATIONS

The present application claims the benefit of U.S. Provisional Application No. 60/432,776, filed Dec. 11, 2002.

TECHNICAL FIELD

Systems and methods are provided for automatically establishing merchant accounts for transaction card usage. More specifically, the systems and methods allow an agent to automatically apply for and automatically receive approval for a merchant to transact commerce with customers who use a transaction card. Moreover, the systems and methods provide real-time information, such as approval or denial notifications and reports to an agent. In addition, the systems and methods provide secure file transfers between an agent and a transaction card issuer/processor.

BACKGROUND

It is generally known for customers to utilize transaction cards for the purchase of goods and services. The proliferation of transaction cards, which allow cardholders to pay with credit rather than cash, started in the United States in the 1950s. Initial transaction cards were typically restricted to select restaurants and hotels and were often limited to an exclusive class of individuals. Since the introduction of plastic credit cards, the use of transaction cards have rapidly proliferated from the United States to Europe, and then to the rest of the world. Transaction cards are not only information carriers, but also typically allow a consumer to pay for goods and services without the need to constantly possess cash, or if a consumer needs cash, transaction cards allow access to funds through an automatic teller machine (ATM). Transaction cards also reduce the exposure to the risk of cash loss through theft and reduce the need for currency exchanges when traveling to various foreign countries. Due to the advantages of transaction cards, hundreds of millions of cards are now produced and issued annually.

Due to the popularity of transaction cards, numerous companies, banks, airlines, trade groups, sporting teams, clubs and other organizations have developed their own transaction cards. However, with the great quantity of different types of transaction cards that are available for use, merchants must be able to accept the transaction cards for the purchase of goods and/or services. Typically, a merchant must be registered with a transaction card issuer/processor before a consumer can use the transaction card to purchase goods and/or services from the merchant. In addition, a merchant typically needs to have specialized equipment, such as a point-of-sale ("POS") device for recognizing the transaction card and approving the sale of the goods and/or services via the transaction card to the consumer.

Typically, merchants are solicited by transaction card issuers/processors and/or their agents to receive the ability to provide transaction card products from transaction card holders. In this situation, the agent of the transaction card issuer/processor will contact a merchant and inquire whether the merchant wishes to receive the ability to offer goods and/or services using the particular transaction card. If a merchant wishes to participate, the agent will prepare an application on behalf of the merchant and submit the same for review by the transaction card issuer/processor. Typical information contained on the application may be information relating to the merchant, such as the merchant's name, address, goods and/or services offered for sale and the like. In addition, information, such as banking information, credit information, or other like information may typically be required by a transaction card issuer/processor. The application form is then submitted to the transaction card issuer/processor for review and approval or denial of the application.

This process typically requires time to fill out the application and submit it to the transaction card issuer/processor. Moreover, the transaction card issuer/processor may require human intervention to physically receive the application, review it, and approve or deny the merchant's application. In addition, time and personnel are required to take an application and transform the data into a usable form by the transaction card issuer/processor. Typically, the transaction card issuer/processor cannot review and approve or deny an application until the data contained on the application is in a form that is usable by the transaction card issuer/processor.

In many cases, the agents of the transaction card issuer/processor are contracted to sign up as many merchants as possible. Therefore, agents may require certain information from transaction card issuers/processors relating to the merchants that they sign up, such as statistical information relating to their success rate, information relating to merchants that the transaction card issuer/processor has approved or denied, information relating to merchants that the transaction card issuer/processor has cancelled the ability to offer transactions using the transaction card, or other like information. In addition, agents may independently cancel the ability for merchants to offer transactions using the transaction cards if the merchant does not follow the proper rules and regulations. These reports can be cumbersome and difficult to communicate easily to the agents. Moreover, these reports may contain sensitive and/or proprietary information relating to the agent, the merchant, or the transaction card issuer/processor so security is typically necessary. Currently, unsecured methods of transferring information are used, including mail, e-mail, telephone calls and the like.

In addition, transaction card issuers/processors may provide certain communications and/or correspondence to the agents from time-to-time. These communications and/or correspondence may also be rather cumbersome and difficult to transmit to the agents. Moreover, the communications may be relatively expensive if printing costs are required and if the transmission of these communications are done via mail or private delivery.

A need exists, therefore, for systems and methods for establishing merchant accounts for transaction card usage that is quick, efficient and easy to use. Moreover, a need exists for systems and methods for providing secure reporting between the merchants or agents and the transaction card issuer/processor. In addition, a need exists for providing communications and correspondence from the transaction card issuer/processor to agents and merchants that otherwise would be costly and relatively inefficient.

A need further exists for systems and methods that overcome the problems associated with prior systems and methods as described above.

SUMMARY

Systems and methods are provided for automatically establishing merchant accounts for transaction card usage. More specifically, the systems and methods allow an agent to automatically apply for and automatically receive approval for a merchant to transact commerce with customers who use a transaction card. Moreover, the systems and methods provide real-time information, such as approval or denial notifications and reports to an agent. In addition, the systems and methods provide secure file transfers between an agent and a transaction card issuer/processor.

Therefore, systems and methods are provided for automatically establishing merchant accounts for transaction card usage that is quick, efficient, and easy to use. Moreover, systems and methods are provided for allowing a transaction card issuer/processor to receive merchant account applications in a usable form such that the decision to approve or deny the merchant request can be accomplished quickly and without the need for much human intervention or any human intervention. The approval or denial of the merchant account application form can be submitted to the transaction card issuer/processor, and an approval or denial may occur within moments of the submission.

Further, the systems and methods provide reports to merchants and/or agents from the transaction card issuer/processor or vice versa. Information relevant to the merchant or agent may be compiled by the transaction card issuer/processor and quickly and efficiently submitted to the agent from the transaction card issuer/processor.

Moreover, the systems and methods provide secure channels of communication between the agent and the transaction card issuer/processor so that sensitive information may be controlled. In addition, the systems and methods provide automatic and instantaneous communication channels between the transaction card issuer/processor and the agent.

Additional features and advantages of the present invention are described in, and will be apparent from, the detailed description of the presently preferred embodiments and from the drawing.

DETAILED DESCRIPTION OF THE PRESENTLY PREFERRED EMBODIMENTS

Figure 1:
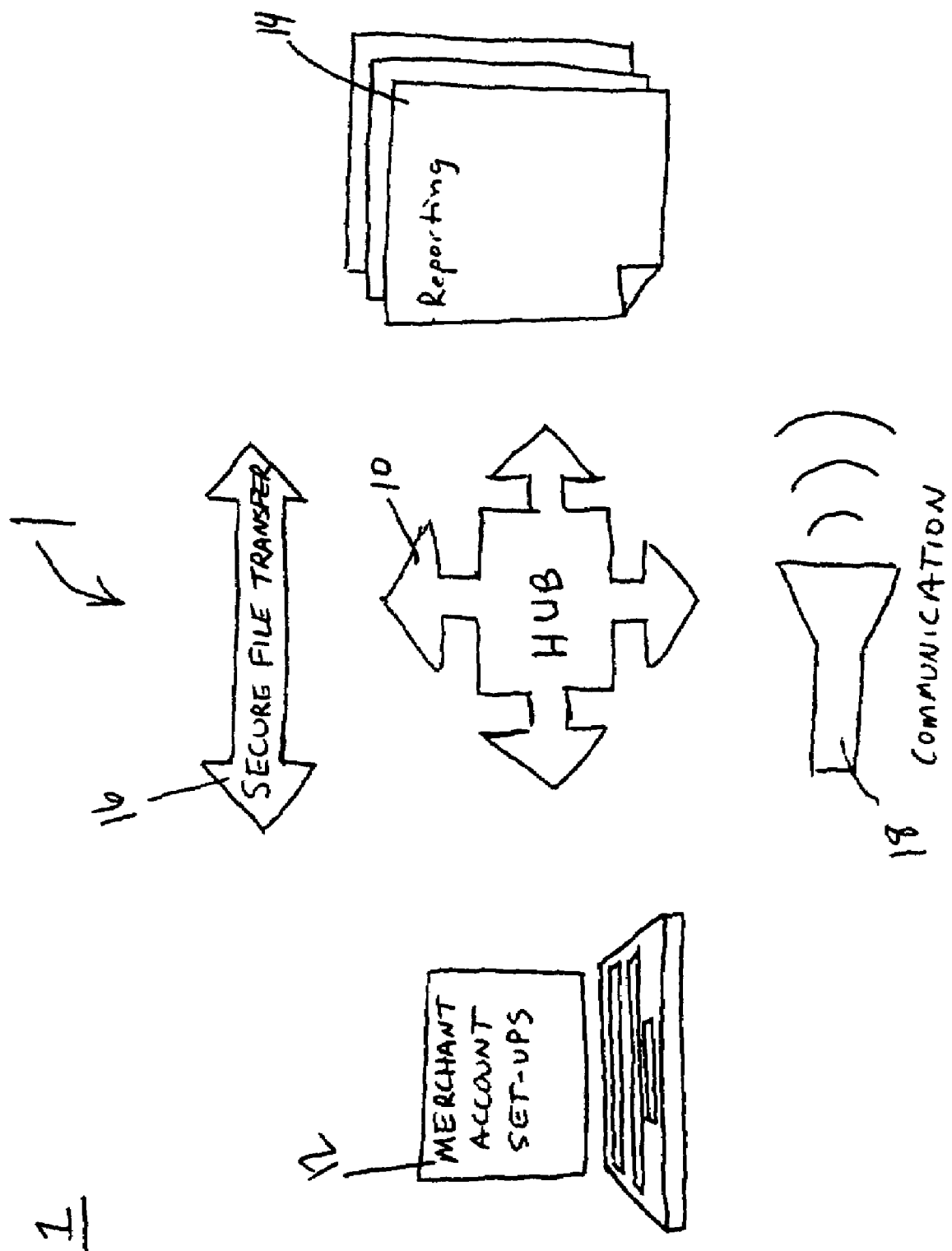
FIG. 1 illustrates a system showing a centralized hub for setting up merchant accounts, securely transferring files, reporting and communicating with merchants and/or agents with a transaction card issuer/provider.

Systems and methods are provided for automatically establishing merchant accounts for transaction card usage. More specifically, the systems and methods allow an agent to automatically apply for and automatically receive approval for a merchant to transact commerce with customers who use a transaction card. Moreover, the systems and methods provide real-time information, such as approval or denial notifications and reports to an agent. In addition, the systems and methods provide secure file transfers between an agent and a transaction card issuer/processor.

Now referring to the figures, wherein like numerals refer to like parts, FIG. 1 illustrates a system 1 in an embodiment of the present invention. The system 1 comprises a centralized hub 10 having the functionality as described below. The hub 10 may be a website, or any other means for allowing an agent of to contact a transaction card issuer/processor and transfer applications, receive reports, securely transmit sensitive files and receive various other communications from the transaction card issuer/processor.

As noted, an agent may complete an application on behalf of the merchant for submission to the transaction card issuer/processor for review by the transaction card issuer/processor via a merchant account set-up 12. The agent acts as a broker between a transaction card issuer/processor and a merchant that may desire to have the ability to offer transactions for goods and/or services using the transaction card issued by the transaction card issuer/processor. The present invention provides a means for submitting the application whereby the information contained on the application may be automatically transferred to the transaction card issuer/processor in a form that can be used and read by the transaction card issuer/processor. For example, the application may be presented to the transaction card issuer/processor in fields on an electronic application form, whereby the transaction card issuer/processor may automatically extract the information from the fields in a readable form.

The application may require certain information of the merchant that the transaction card issuer/processor may then utilize to determine whether the merchant can offer transactions using the transaction card issued by the transaction card issuer/processor. When an agent completes the application and submits it to the transaction card issuer/processor, the transaction card issuer/processor may receive the information and review the data to determine whether to approve the application. This may be done automatically and approval of the merchant may be accomplished without human intervention. By submitting the application to the transaction card issuer/processor via the central hub 10, the transaction card issuer/processor may approve or deny the application and immediately send a message back to the agent whether the application has been approved or denied.

In addition, the agent may send, at the same time, a batch of a plurality of applications to the transaction card issuer/processor. Once received, the transaction card issuer/processor may automatically approve or deny each application individually and send individual messages back to the agent regarding the approval or denial of each individual application. Alternatively, the transaction card issuer/processor may approve or deny each application and send a single message to the agent relating to the approval or denial of each application.

Preferably, the central hub 10 is a website. However, the central hub may be any system having the functionality as described herein. For example, the central hub 10 may be a dial-in system or otherwise be a site on the Internet or other network whereby the agent may send the application to the transaction card issuer/processor via the Internet.

The transaction card issuer/processor may communicate directly with the agent and provide reports to the agent via the central hub 10. For example, an agent may receive compensation for the number of merchants registered via the application process noted above. The transaction card issuer/processor may keep records of the number of merchants any particular agent has registered, and may further conduct statistical analyses of the records. Reports 14 may be generated by the transaction card issuer/processor that may be immediately communicated to the agent via the central hub 10. Of course, any other information may be contained within the reports as may be apparent to one having ordinary skill in the art.

Moreover, certain files may need to be transferred between the agent and the transaction card issuer/processor. The central hub 10 may include a "secure file transfer"

means 16 whereby sensitive information relating to merchants, agents, or the transaction card issuer/processor may be transferred between the agent and transaction card issuer/processor. For example, an agent may have the ability to cancel the registration of a merchant for any reason. If this happens, the agent typically must inform the transaction card issuer/processor. However, the information that must be communicated to the transaction card issuer/processor relating to the cancellation of a merchant is typically sensitive and should not be made public. In addition, other information, such as banking change information, risk evaluation data and risk assessment upgrades or downgrades may be communicated securely via the present invention. The secure file transfer means 16 may be utilized for this purpose.

Finally, the central hub 10 may allow the transaction card issuer/processor to communicate directly with the agent via a communication means 18. Various communications, such as correspondence, newsletters, operating regulations, updates, alerts, events, and the like may be generated by the transaction card issuer/processor and submitted to the agent via the central hub 10.

It should be noted that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A system for automatically establishing a merchant account for transaction card usage comprising:
   a central hub and communication means operable to provide communications between an agent and a transaction card issuer/processor;
   the transaction card issuer/processor operable to receive from an agent a merchant application for registration with the transaction card issuer/processor, wherein the application is completed on behalf of the merchant by the agent;
   the transaction card issuer/processor operable to provide to the agent at least one of an approval and denial notification through the central hub; and
   the transaction card issuer/provider operable to provide to the agent a report related to at least one registered merchant, wherein the at least one registered merchant was registered with the transaction card issuer/processor by the agent.

2. The system of claim 1 wherein the central hub is a website.

3. The system of claim 1 wherein the communication means utilize a file transfer protocol on the internet.

4. The system of claim 3 wherein the file transfer protocol allows for secure file transfer between the agent and the transaction card issuer/processor.

5. The system of claim 1 wherein the merchant application submitted to the transaction card issuer/processor comprises information automatically readable by the transaction card issuer/processor.

6. The system of claim 1 wherein said report submitted to the agent comprises a grant or denial of the merchant application submitted to the transaction card issuer/processor.

7. The system of claim 1 wherein said report comprises a statistical record relating to the success rate of the agent in establishing merchant accounts.

8. The system of claim 1 further comprising means for sending a file to the transaction card issuer/processor from the agent.

9. The system of claim 8 wherein said file comprises a report detailing changes to the merchant account.

10. The system of claim 1 wherein said communication means communicates a plurality of merchant applications simultaneously to the transaction card issuer/processor.

11. A method for automatically establishing a merchant account for transaction card usage for a merchant between an agent and a transaction card issuer/processor comprising:
    providing communication between an agent and a transaction card issuer/processor through a central hub and communication means;
    the transaction card issuer/processor receiving from an agent a merchant application for registration with the transaction card issuer/processor, wherein the application is completed on behalf of the merchant by the agent;
    the transaction card issuer/processor providing to the agent at least one of an approval and denial notification through the central hub; and
    the transaction card issuer/processor providing to the agent a report related to at least one registered merchant, wherein the at least one registered merchant was registered with the transaction card issuer/processor by the agent.

12. The method of claim 11 wherein said central hub is a website.

13. The method of claim 11 wherein said merchant account application is submitted to the transaction card issuer/processor via a file transfer protocol.

14. The method of claim 11 further comprising the step of the agent submitting the merchant account application and/or the automatic communication via a secure file transfer protocol.

15. The method of claim 11 further comprising the step of the agent receiving a report from the transaction card issuer/processor.

16. The method of claim 15 wherein the report comprises a statistical record relating to the success rate of the agent in establishing merchant accounts.

17. The method of claim 11 further comprising the step of the agent submitting a file to the transaction card issuer/processor.

18. The method of claim 11 wherein the step of the agent receiving the automatic communication from the transaction card issuer/processor occurs substantially immediately after the step of the agent submitting the merchant account application to the transaction card issuer/processor.

19. The method of claim 11 further comprising the step of the agent submitting a plurality of merchant account applications to the transaction card issuer/processor.

20. The method of claim 19 further comprising the step of the agent receiving a plurality of automatic communications relating to the approval or denial of the plurality of merchant account applications.

* * * * *